United States Patent Office 2,751,478
Patented June 19, 1956

2,751,478

WELDING COMPOSITION

Clarence E. Jackson and Arthur E. Shrubsall, Niagara Falls, N. Y., assignors to Union Carbide and Carbon Corporation, a corporation of New York No Drawing. Application April 28, 1953,
Serial No. 351,756

3 Claims. (Cl. 219—10)

This invention relates to electric welding processes in which molten metal is deposited from a bare metal electrode onto a metal workpiece and coalesced with the latter, the entire welding zone including the melting end of the electrode and the molten deposited metal being covered by a deep blanket of a "welding medium," or "melt." The welding medium may be of partially molten, initially comminuted and unbonded silicates or the like substantially free from gas evolving substances, or other welding media, for example, silica, alumina, lime and magnesia may be used. Such processes are described, for instance, in Jones et al. Patent 2,043,960 and Miller Patent 2,228,639.

When an electrode containing chromium and molybdenum is employed in the welding processes above suggested there is an incomplete recovery in the amount of chromium and molybdenum in the weld metal, due perhaps to oxidation. Also, there is an increase or build-up of silicon in the weld metal, due perhaps to reduction, both of these results being undesirable. It is customary in the art to control high alloy analysis by proper choice of electrode composition, but the procurement of electrodes with chromium and molybdenum contents suitable for use on a range of alloys is sometimes inconvenient or difficult. It would, therefore, be desirable to provide welding media of such nature as to increase chromium and molybdenum in the weld metal and to reduce the build-up of silicon in the weld metal.

An object of this invention is to provide a welding medium of novel composition and properties so designed so as to inhibit the loss of chromium and molybdenum from the weld deposit and at the same time to inhibit the increase or build-up of silicon in the weld metal. Another object of the invention is a welding composition which makes possible the deposition of metal higher in chromium and molybdenum contents than in the electrode used. According to the present invention welding media for the objectives described consist of comminuted fused mixtures comprising about 33% to 40% silica, up to 6.5% calcium fluoride, 6% to 12% manganese oxide, 5% to 16% alumina, 17% to 24% lime, up to 15% magnesia, up to 20% titania, 1% to 10% chromium oxide (calculated as $Cr_2O_3$) and 0.5% to 2% molybdenum oxide (calculated as $MoO_3$). The mixtures are preferably prepared for use by fusing the ingredients, then solidifying and comminuting the material, although the oxides of chrominm and molybdenum may be added mechanically to the other ingredients which have been previously fused, solidified and comminuted.

Within the ranges listed, the following compositions have given satisfactory results:

|  | A | B |
|---|---|---|
| $SiO_2$ | 37.90 | 33.60 |
| $CaF_2$ | 5.40 | 5.48 |
| $MnO$ | 11.54 | 9.39 |
| $Al_2O_3$ | 4.93 | 12.96 |
| $CaO$ | 17.10 | 21.86 |
| $MgO$ | Nil | 11.30 |
| $TiO_2$ | 17.71 | 0.33 |
| $Cr_2O_3$ | 4.48 | 3.85 |
| $MoO_3$ | 0.80 | 0.47 |

The above mixtures were prepared by fusing the compounds followed by solidfication and comminution, although the chromium and molybdenum oxides may be added mechanically to the previously prepared mixtures, as heretofore stated.

The following listed results are given to demonstrate the success of this invention. Composition "B" was used in making welds in plain carbon steel plates in thicknesses of ½, 1 and 1½ inches. The electrode used was steel welding rod having the following approximate composition: carbon 0.1%; manganese 2%; silicon .05% maximum. Chemical analysis of the weld metal in each test were as follows:

| Plate Thickness | Percent Silicon | Percent Chromium | Percent Molybdenum |
|---|---|---|---|
| ½ | 0.21 | 0.42 | 0.08 |
| 1 | 0.04 | 0.58 | 0.13 |
| 1½ | 0.11 | 0.56 | 0.13 |

The above results show that the presence of chromium and molybdenum in the weld metal can be obtained from their presence as oxides in the melt itself.

In a test made with composition "B" for welding type 347 (A. S. T. M.) stainless steel with the same composition rod (type 347, A. S. T. M.); chemical analyses were as follows:

Percent chromium
Plate metal _____ 18.53
Rod metal _____ 20.17
Weld metal _____ 18.95

The above listed results show that the chromium content of the weld metal is higher than a calculated admixture of the rod and base plate would indicate; it thus appears that there is a recovery of all the chromium in the electrode and plate plus a gain of about 0.5% chromium in the weld metal obtained solely from the melt itself.

With reference to the inhibition of silicon build-up, the following results were obtained using composition "B," but with the chromium oxide percentage varied, as shown, to produce multipass welds in 2-inch plain carbon steel plate. The electrode used was steel welding rod having the following approximate composition: carbon 0.1%; manganese 2%; silicon 0.05% maximum. Chemical analyses of sections of the weld metal were as follows:

*Analysis of weld deposit produced with composition "B" containing indicated $Cr_2O_3$*

| Location | 0% $Cr_2O_3$ | | 1% $Cr_2O_3$ | | 2% $Cr_2O_3$ | | 4% $Cr_2O_3$ | |
|---|---|---|---|---|---|---|---|---|
| | Percent Si | Percent Cr | Percent Si | Percent Cr | Percent Si | Percent Cr | Percent Si | Percent Cr |
| Top | 0.50 | 0.10 | 0.44 | 0.70 | 0.51 | 0.68 | 0.26 | 2.13 |
| Center | 0.50 | 0.11 | 0.44 | 0.48 | 0.51 | 0.69 | 0.29 | 2.10 |
| Bottom | 0.22 | 0.12 | 0.38 | 0.36 | 0.47 | 0.84 | 0.20 | 1.66 |

In other weld tests in which single-pass welds in one inch thick plate employing the same metals were produced, the following results were obtained:

| Weld Metal | 0% $Cr_2O_3$ | 1% $Cr_2O_3$ | 2% $Cr_2O_3$ | 4% $Cr_2O_3$ |
|---|---|---|---|---|
| Chromium | 0.07 | 0.15 | 0.23 | 0.44 |
| Silicon | 0.27 | 0.27 | 0.29 | 0.23 |

The above listed results clearly demonstrate that the presence of $Cr_2O_3$ in the melt of the invention not only increases the chromium content of the weld deposit but also inhibits the build-up of silicon in the weld metal. The small percentage of chromium in the weld metal when no oxide was added is attributed to the small percentage commonly found as a trace in the plate and electrode.

In other tests, deposits of metal were produced from a steel welding electrode containing about 2.33% chromium and about 0.86% molybdenum, the deposits being produced under melts of compositions "A" and "B," referred to above, with various additions of chromium and molybdenum oxides. In every case the weld metal deposit produced with unmodified melts, that is, those containing no added chromium or molybdenum oxides, there was an appreciable loss of chromium and molybdenum evidenced by analysis of the deposit. However, when chromium and molybdenum oxides were added to the melt in accordance with this invention, the loss of these elements was minimized, and in many cases the weld deposit contained substantially more chromium and molybdenum than did the electrode. Similar results were obtained utilizing welding electrodes containing 0.07% chromium and 0.52% molybdenum. Typical results of these tests are summarized in the following table, the analyses being of the last layer of a six-layer weld pad:

| Base | Melt Composition | | Electrode Composition | | Weld Metal Composition | |
|---|---|---|---|---|---|---|
| | Percent $Cr_2O_3$ | Percent $MoO_3$ | Percent Cr | Percent Mo | Percent Cr | Percent Mo |
| B | Nil | Nil | 2.33 | 0.86 | 1.65 | 0.75 |
| B | 2.75 | 1 | 2.33 | 0.86 | 2.25 | 0.96 |
| B | 2.75 | 1 | 2.33 | 0.86 | 2.50 | 0.98 |
| A | 2.75 | 1 | 2.33 | 0.86 | 2.05 | 0.91 |
| A | 4.25 | 1.5 | 2.33 | 0.86 | 2.32 | 1.42 |
| B | 6.0 | Nil | 2.33 | 0.86 | 2.84 | 0.82 |
| B | 6.0 | 2 | 2.33 | 0.86 | 3.50 | 1.41 |
| B | 10 | 1 | 2.33 | 0.86 | 3.9 | 1.03 |
| B | Nil | Nil | 0.07 | 0.52 | 0.06 | 0.48 |
| B | 4 | Nil | 0.07 | 0.52 | 0.98 | 0.48 |
| B | 4 | 1 | 0.07 | 0.52 | 1.45 | 0.68 |
| B | 8 | 1 | 0.07 | 0.52 | 1.47 | 0.70 |
| B | 8 | 1 | 0.07 | 0.52 | 1.40 | 0.86 |
| A | 4.25 | 1.5 | 0.07 | 0.52 | 0.86 | 0.92 |

The above listed results show the loss of chromium and molybdenum in the weld metal, even though present in the electrode; also there is shown the success of supplying chromium and molybdenum to the weld metal by the addition of their oxides to the melt.

We claim:

1. In an electric welding process of the submerged melt type wherein a blanket of comminuted, silicon-containing welding medium covers the welding region of a workpiece and a welding electrode is submerged in said welding medium, the improvement of preventing the enrichment of the silicon content in the weld metal, and enriching the weld metal in molybdenum and chromium content, said improvement comprising incorporating oxides of chromium and molybdenum in the welding medium in amounts between about 1% and 10%, and between about 0.4% and 2%, respectively, by weight of the welding medium.

2. In an electric welding process of the submerged melt type wherein a blanket of comminuted, silicon-containing welding medium covers the welding region of a workpiece and a welding electrode containing molybdenum and chromium alloying elements is submerged in said welding medium, the improvement of reducing the depletion of such molybdenum and chromium alloying elements and the enrichment of the silicon content in the weld metal, said improvement comprising incorporating oxides of chromium and molybdenum in the welding medium in amounts between about 1% and 10%, and between about 0.4% and 2%, respectively, by weight of the welding medium.

3. An electric welding medium for blanketing the welding region of a workpiece and covering the end of a welding electrode containing Mo and Cr alloying elements, and characterized by its ability to minimize the depletion of Mo and Cr values in the deposited molten electrode metal and to substantially prevent the enrichment of the silicon content in said deposited metal, said welding medium being composed of about 6% to 12% manganese oxide, 4% to 16% alumina, 17% to 24% lime, 1% to 10% chromium oxide, 0.4% to 2% molybdenum oxide, up to 6.5% calcium fluoride, up to 15% magnesia, up to 20% titania, and the remainder silica, the silica being between 33% and 40% by weight of the welding medium.

References Cited in the file of this patent

UNITED STATES PATENTS

| 1,926,090 | Frickey et al. | Sept. 12, 1933 |
| 2,023,818 | Muller | Dec. 10, 1935 |
| 2,043,960 | Jones et al. | June 9, 1936 |
| 2,200,737 | Clapp | May 14, 1940 |
| 2,228,639 | Miller | Jan. 14, 1941 |
| 2,308,194 | Miller | Jan. 12, 1943 |
| 2,435,852 | Stringham | Feb. 10, 1948 |
| 2,544,334 | Linnert | Mar. 6, 1951 |